United States Patent [19]

Martin

[11] Patent Number: 4,589,807

[45] Date of Patent: May 20, 1986

[54] HOLE PRODUCTION TOOL

[76] Inventor: Louis G. Martin, 12139 N. Linden Rd., Clio, Mich. 48420

[21] Appl. No.: 555,288

[22] Filed: Nov. 25, 1983

[51] Int. Cl.[4] .............................................. B23B 51/04
[52] U.S. Cl. ..................................... 408/205; 408/204
[58] Field of Search ............... 408/204, 205, 206, 207, 408/221, 219, 703, 203.5, 704, 713

[56] References Cited

U.S. PATENT DOCUMENTS

| | | | |
|---|---|---|---|
| 1,219,677 | 3/1917 | Sparks | 408/204 |
| 1,279,495 | 9/1918 | Dom | 408/204 |
| 1,557,464 | 10/1925 | Mick | 408/204 X |
| 2,564,451 | 8/1951 | Sandberg et al. | 408/206 |
| 2,606,615 | 8/1952 | Devey et al. | 408/205 |
| 3,512,519 | 5/1970 | Hall | 408/205 X |
| 4,060,333 | 11/1977 | White | 408/204 X |

FOREIGN PATENT DOCUMENTS 777245  11/1934  France ................. 408/205

Primary Examiner—Z. R. Bilinsky
Assistant Examiner—Glenn L. Webb
Attorney, Agent, or Firm—John J. Swartz

[57] ABSTRACT

Apparatus for cutting a circular hole in a workpiece having relatively low compression strength, including a hollow cylindrical drill having, at its outer terminal end, an annular cutting edge of a predetermined diameter for cutting a hole in the object. The drill includes a cylindrical wall having an axially inwardly converging sidewall portion for radially compressing the material severed from the object being cut and an inner cylindrical throat portion of a predetermined axial length and a predetermined reduced diameter for forming a continuous core of severed material. The cylindrical wall includes a tubular discharge section, axially inward of the throat and communicating with an open outlet end of the tubular member, to allow the compressed core to partially radially expand and freely axially pass. The diameter of the discharge tubular section is greater than the diameter of the throat portion but less than the diameter of the annular cutting edge.

2 Claims, 6 Drawing Figures

U.S. Patent  May 20, 1986  4,589,807
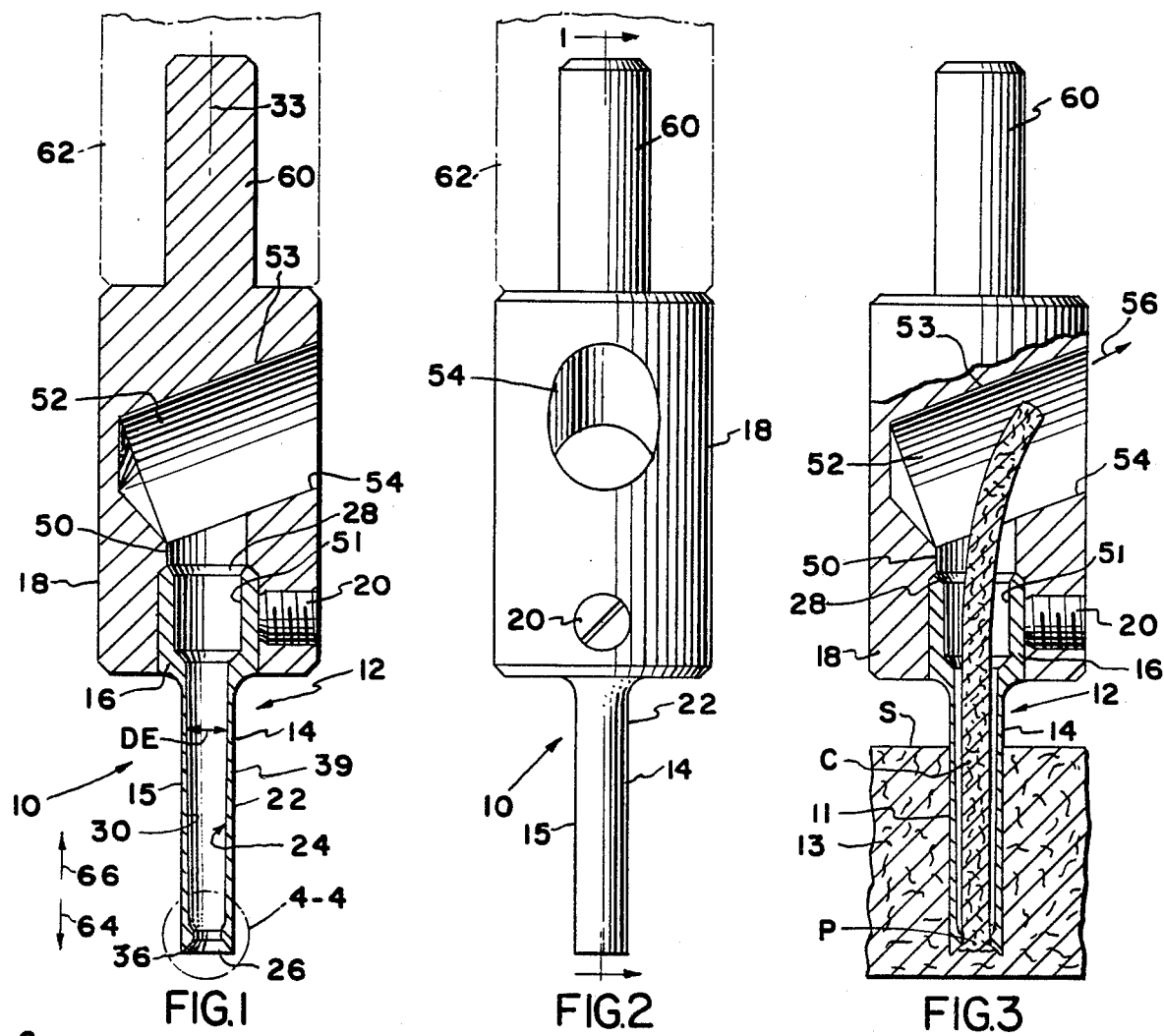
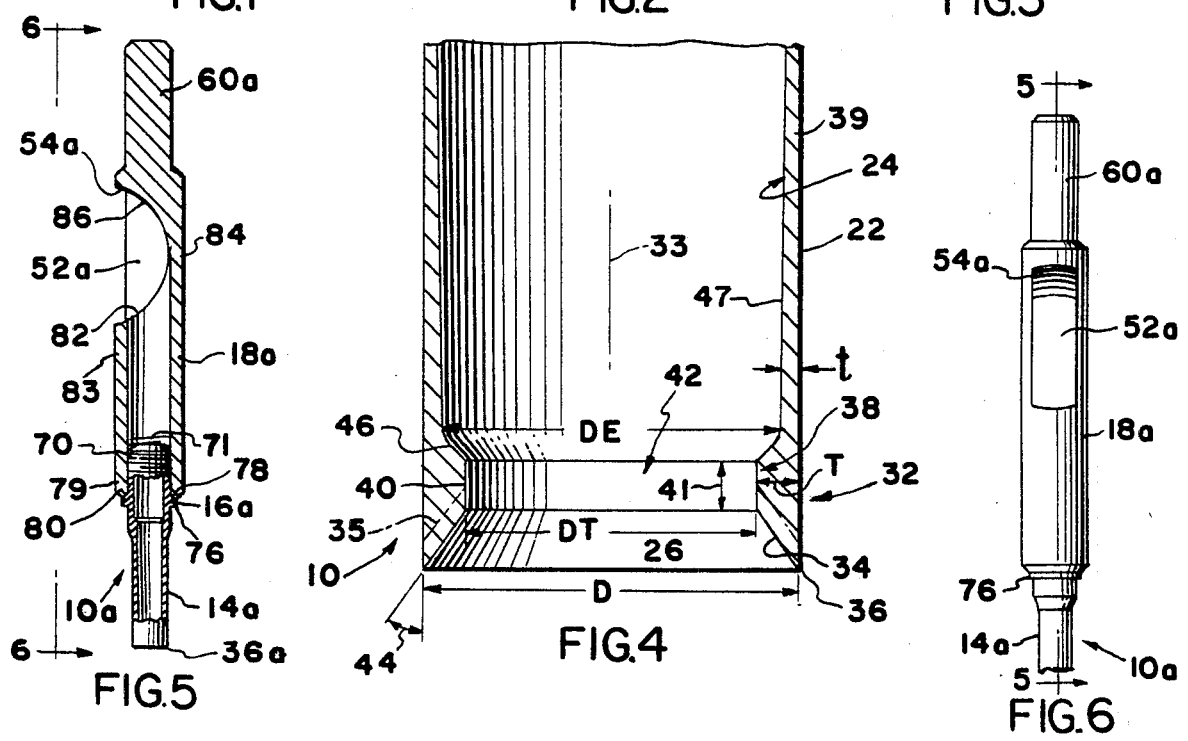

4,589,807

HOLE PRODUCTION TOOL

BACKGROUND OF THE INVENTION

1. Field of the Invention

This invention relates to a hole production tool and, more particularly, to a hollow rotary drill for cutting circular holes in material which has a relatively low compression strength, for example rubber, cork, wood, and laminated composite aramid fibre material such as that sold under the trademark KEVLAR by the DuPont Corporation.

2. Description of the Prior Art

Laminated aramid fibrous product, sold under the Trademark "KEVLAR" by DuPont Corporation is a "space-age" composite material which was developed for use as structural items in spacecraft, airplanes, boats, etc. The product has gained wide acceptance in these markets because of its high strength and low weight.

Machining KEVLAR material with a conventional drill bit frequently causes "fuzzing" about the edges of the hole being cut. A conventional drill bit will also cut the drilled material into small pieces, creating dust and small particles which can be physically irritating and possibly hazardous to human health. Accordingly, it is an object of the present invention to provide a new and novel hollow rotary drill for cutting a smooth hole in relatively low compression strength materials, particularly the KEVLAR material, without resultant "fuzzing" and without cutting the drilled material into small pieces.

Hollow rotary drills have been provided heretofore and have been utilized in the paper industry to produce holes in paper and other goods such as that disclosed in U.S. Pat. No. 1,557,464 granted to W. K. Mick on Oct. 13, 1925; and U.S. Pat. No. 1,219,677 granted to Walter Sparks on Mar. 20, 1917. As the prior art hollow rotary drill cuts through the stack of sheets, it will cut individual paper discs which will independently pass upwardly through the hollow drill shank. The cutting of a a hole in a stack of sheets of paper does not have the attendant material jamming problems associated with cutting a workpiece having a relatively low compression strength such as the aforementioned "KEVLAR" material. The individual discs cut from the individual sheets of paper will remain as individual discs and will not tend to bind together as will the drilled portion of the KEVLAR material.

Other prior patented hollow tubular cutting drills are illustrated in U.S. Pat. No. 2,564,451 granted to Ray A. Sandberg, et al on Oct. 14, 1951; U.S. Pat. No. 2,606,615 granted to Claude V. Pevey, et al on Aug. 12, 1952; U.S. Pat. No. 3,512,519 granted to Robert M. Hall on May 19, 1970; and U.S. Pat. No. 4,060,333 granted to John T. White on Nov. 29, 1977.

The hole production member constructed according to the present invention includes a hollow, rotary, tubular drill shank having, at its axially outer end, radially inner and outer cylindrical surface portions which axially outwardly converge to form an annular cutting edge. The severed material forms a core which passes axially inwardly, through a hollow passage provided in the drill shank, having a radially inwardly converging annular internal surface for radially compressing the core and upwardly passing it through a reduced diameter throat. The drill shank includes a hollow tubular passage, having a diameter greater than the diameter of the throat, above the throat to permit the radially compressed cored material to partially radially expand and yet freely axially pass without "binding up".

If the yield point of the drill shank material is too low, the annular cutting edge may radially outwardly billow, sometimes referred to as "bell-mouthing". Also, if the drill material is over-stressed or too hard, fractures may occur, and the material, starting at the cutting edge, will crack and fail. The construction of the hollow cutting drill according to the present invention is such as to inhibit the occurrence of "bell-mouthing" of the annular cutting edge due to high stress.

It has been found that sufficient material must be distributed at the cutting edge and throat area to reduce the operating stress in the drill shank to an acceptable level. This can be accomplished by decreasing the throat diameter, increasing the throat length, and increasing the cutting edge angle which, as used herein, will refer to the included angle between radially inner and outer, axially outwardly converging drill shank surfaces which converge to form the annular cutting edge.

Cutting thrust must be low enough to minimize tool stress and yet be within acceptable limits for drilling or cutting holes. The thrust is controlled, in part, by the cutting edge angle and the throat diameter. Once the angle is established, the throat and outside diameters of the cutting tool combine to produce a "projected area" of the tool as "seen" by the workpiece. It is this projected area which predominantly dictates the thrust requirements. With a fixed cutting edge angle, increasing the outside diameter of the cutting tool causes an exponential increase in thrust requirements, which can be reduced by a corresponding increase in throat diameter, which in turn increases the stress and the possibility of failure. These factor must be balanced relative to the cutting thrust requirements and the stress requirements.

Increasing the cutting edge angle is not necessarily efficient in stress reduction, since a large cutting edge angle increases the cutting thrust load, which in turn tends to increases the stress. Decreasing the throat diameter provides an increased cross-sectional area of material to reduce stress but has an attendant increased cutting thrust load.

It has been found that additional stress reduction without representing a significant impediment to the flow of workpiece material through the throat area, may be gained by lengthening the throat area without. Accordingly, it is an object of the present invention to provide a new and novel rotary hollow cutting drill of the type described, having a new and improved throat construction and a cutting edge angle which lies within a range of 30° to 45°.

It is another object of the present invention to provide a new and novel rotary, hollow cutting drill of the type described, which includes a new and novel, material-compressing throat construction for radially compressing and axially elongating a cylindrical core of material removed from the workpiece.

A further object of the present invention is to provide new and novel rotary drill apparatus of the type described having a hollow drill shank, provided with a new and novel throat construction, which will permit the tool to be re-sharpened without changing the cutting edge angle, the relative dimensions of the diameter of the hole being cut, and the diameter of the throat.

As used herein, strain ratio is a term which means the distance which the material being cut diametrically compresses relative to the original diameter. For example, if the material being cut has an original diameter of 0.25 inches and it is diametrically compressed 0.05 inches, the result is a twenty percent strain. If the drilled core material, such as KEVLAR, is strained only a relatively small amount while passing through the reduced diameter throat area, the core will yield under compressive force but immediately, upon release of force, will spring back to its original shape and will frictionally bind on the drill shank side wall as the core flows upwardly through the drill. Accordingly the effects of plastic strain as well as elastic strain must be considered. With elastic strain only, upon release of the compressive forces, the material will spring back to its original shape. With plastic strain, however, the material, upon release of the compressive forces, will not return to its original dimensions. In some cases, both elastic and plastic strain occurs.

With apparatus constructed according to the present invention, the drill material forms a core which is compressed sufficiently to induce plastic strain, so that when the core material passes upwardly beyond the throat, it will not expand to its original size.

If the diametrical compressive strain is inadequate, the workpiece material core or slug removed will bind up in the exit area, creating increased cutting thrust and even "jamming" of the core in the tool. Strains below 25 percent will not effectively delaminate the KEVLAR, and strains over 35 percent create excessive drilling thrust and stress.

It has been determined that the severed KEVLAR material, when subjected to a certain radial strain, will delaminate the workpiece core sufficiently for it to flow, substantially uninhibited, upwardly through the internal passage provided in the cutting tool. Accordingly, it is another object of the present invention to provide a new and novel hollow rotary cutting drill of the type described, wherein the relative dimensions of the diameter of the cutting edge and the throat are such that the core material is subjected to a radially compressive plastic strain in the range of 25 percent to 36 percent.

It has also been found that the diameter of the tubular drill shank exit portion downstream or axially inward of the throat must be sufficiently larger than the throat diameter so as to allow for unhibited movement of the radially compressed core. It has been found that this factor is measured by the ratio of the throat strain to the exit strain required. It has been found that the tubular drill shank member must be constructed such that the predetermined diameter of the annular cutting edge, less the diameter of the throat diameter, relative to the predetermined diameter, less the diameter of exit diameter, lies within a range of 1.45 to 6.0.

Other objects and advantages of the present invention will become apparent to those of ordinary skill in the art as the description thereof proceeds.

SUMMARY OF THE INVENTION

Drill apparatus for cutting a circular hole in a workpiece to form a core and removing the core from the formed hole, comprising: a rotatable, elongate hollow drill shank having an annular cutting knife edge at the axially outer end thereof for cutting a circular hole in the material; the drill shank including a hollow cylindrical tubular member having an inlet opening at the axially outer end thereof, an axially outlet opening, at the axially inner end and an elongated, axially-extending passage for passing the core from the inlet opening to the outlet opening. The tubular member includes mechanism for radially inwardly compressing and concurrently axially elongating the core comprising an inner tapered cylindrical wall surface portion which radially inwardly converges in an axially inward direction from the annular cutting edge, and a right circular cylindrical wall surface portion extending axially inwardly from the axially inner end of the tapered wall surface to provide a reduced diameter throat for receiving and axially passing the compressed core. The tubular member includes, axially inwardly of the throat, an elongated tubular passage having an internal diameter which is greater than the diameter of the throat but less than the diameter of the annular cutting edge, to allow the compressed material to partially radially expand after it passes axially inwardly of the throat.

BRIEF DESCRIPTION OF THE DRAWINGS

The invention may be more readily understood by referring to the accompanying drawings, in which:

FIG. 1 is a sectional front view of hole producing apparatus constructed according to the present invention, taken along the line 1—1 of FIG. 2;

FIG. 2 is a side elevational view of the apparatus illustrated in FIG. 1;

FIG. 3 is a front elevational view similar to FIG. 1, illustrating the hole producing apparatus cutting a hole and removing a core of material severed from the workpiece;

FIG. 4 is a greatly enlarged front sectional view of the axially outer terminal cutting portion illustrated in the chain line circle 4—4 of FIG. 1;

FIG. 5 is a front sectional elevational view of a slightly modified construction taken along the line 5—5 of FIG. 6; and FIG. 6 is a side elevational view of the embodiment illustrated in FIG. 5, taken along the line 6—6 of FIG. 5.

DESCRIPTION OF THE PREFERRED EMBODIMENT

Apparatus constructed according to the present invention, generally designated 10, is particularly adapted for use in cutting a hole 11 in a sheet 13 of material, having a relatively low compression strength, such as rubber, cork, wood, or a laminated product manufactured from aramid fibres and sold under the trademark KEVLAR by DuPont Corporation. The KEVLAR material 13 includes alternate layers of aramid fibrous material and resin, subjected to heat and/or pressure, to form a unitary workpiece but which, when cut and sufficiently radially compressed and strained, will tend to shear between the layers, delaminate and lengthen. The laminated KEVLAR material, when cut and sufficiently compressed, tends to shear between the layers and will delaminate to form a radially reduced, axially lengthened, continuous core C.

The apparatus 10 includes a rotatable cutter, generally designated 12, including a hollow, one-piece tubular drill shank 14 having an enlarged diameter, axially inner, hollow mounting head 16 coupled to a rotatable driver 18 via a set screw 20. The hollow tubular cylindrical drill shank 14 includes an annular cylindrical sidewall 15 having a cylindrical outer surface 22 of uniform diameter, and an internal cylindrical surface, generally designated 24, of varying diameter. The drill shank 14 includes an axially outer inlet opening 26, an axially inner material discharge opening 28, and an axially extending, variable diameter internal passage 30 extending from the axially outer inlet opening 26 to the axially outer discharge opening 28.

The tubular member sidewall 15 includes a material compressing portion, generally designated 32, at the axially outer terminal end portion thereof, (FIG. 4) having a cylindrical tapered surface portion 34 which radially outwardly converges toward the cylindrical outer surface 22 to provide an annular, terminal, cutting knife edge 36 having a predetermined diameter D. The tapered surface 34 converges radially inwardly, in an axially inner direction, toward the rotational axis 33 of tubular member 14. The typical size for a cutting tool has a diameter D in the range of 0.20 inches to 0.3750 inches.

The annular cylindrical side wall 15 of tubular drill shank 14 includes a throttle or throat-defining annular wall portion 38 and a relatively thin-walled cylindrical exit portion 39 which is disposed axially inward of the throat defining portions 38. The throat defining portion 38 has a wall thickness T which is substantially greater than the thickness t of the cylindrical exit wall portion 39. The throat-defining portion 38 includes a right-circular, cylindrical inner surface 40 defining a reduced diameter throat, generally designated 42, having a diameter DT which is substantially less than the diameter D of the cutting edge 36 and the hole 11 being cut. The throat-defining area 38 permits the tool, after use, to be resharpened so that the surface 34 will recess to the position illustrated in chain lines at 35 without changing the relative sizes of the throat diameter DT and the diameter D of the cutting edge 36. In this way, the tool may be resharpened without changing the strain ratios.

The throat 38 must be of sufficient length to achieve proper stress reduction but not so long as to create a significant impediment to the flow of the workpiece core or slug C through the tool. It has been found that a nominal throat length 41 in the range of 0.040 to 0.060 inches is adequate for stress while not being so long as to create a significant impediment to the flow of the workpiece core C through the throat.

The portion P of core C which is received in throat 42 is illustrated as having been subjected to plastic strain so that after it passes through the throat 42, it will not radially re-expand to the internal diameter DE of tubular exit portion 39. The tubular member 14 suitably comprises tool steel having a hardness in the range of 60 to 66 on the Rockwell C hardness scale, which will increase the yield point sufficiently to minimize "bell-mouthing" of the material compressing portion 32 and cutting edge 36. The throat-defining area 38 and material compressing portion 32 provide sufficient material distributed at the cutting edge-throat area to reduce the operating stress in material cutting portion 32 and cutting edge 36 to an acceptable level. The included angle 44 between the plane of the annular tapered cutting surface 34 and the outer cylindrical surface 22 lies in the range of 30°–45° to maximize cutting performance.

The axially inner cylindrical tubular wall portion 39 has an internal wall surface 47 of a diameter DE which is greater than the diameter DT of the throat 42 but less than the diameter D of the annular cutting edge 36 and hole 11 being drilled. The relative dimensions of the exit diameter DE to the throat diameter DT and the cutting edge diameter D is important to provide proper operation of the device. The exit diameter DE must be sufficiently larger than the throat diameter DT so as to allow for the easy axially inward movement of the reduced diameter core C. The workpiece core C must undergo sufficient strain so as not to expand, upon leaving throat 42, to a diameter greater than the exit diameter DE. The sidewall portion 39 is axially inwardly tapered and the internal smooth cylindical surface portion 47 radially outwardly diverges in an axially inward direction to allow the delaminated, extended length core C to expand and undergoing the attendant diameter increase. If the exit diameter DE is too small such that the core C expanded so as to tightly frictionally engage the inner surface 47, the core C would axially shorten and further increase in diameter (the reverse of the "Chinese Finger Trick") to prevent the smooth uninhibited exit of the slug S through the drill body 14. The diameter DE of surface 47, axially inward of fillet 46, increases in an axially inward direction at a rate of at least 0.001 radial inches for each axial inch. With continued upward, or axially inward, passage of the core C, the core C gradually diametrically expands and thus it is important that the diameter DE likewisely gradually increase to accommodate this expansion.

The relative dimensions of the annular cutting edge diameter D, the throat diameter DT, and the exit diameter DE is important. The removed core C must be overstrained, so as to undergo plastic strain, at P as it passes through the throat 42 so that after the radially compressive force is released as the core material passes the throat 42 and is received by the axially inner tubular portion 39, the radial expansion of the core material is not so great as to cause the core material C to frictionally bind on the sidewall 39 to prevent its upward movement therethrough.

The relative dimensions of the cutting edge 46, throat defining portion 38, and the exit tubular portion 39 and the attendant sizes of the annular cutting edge diameter D, the throat diameter DT and the exit diameter DE are important to establish the proper strain and are selected such that the ratio of (D-DT)/D lies within the range of 0.25 to 0.36, the ratio of (DE-DT)/DT lies within the range of 0.16 to 0.39, the ratio of (D-DE)/D lies within the range of 0.04 to 0.24, and the ratio of (D-DT)/D-DE lies within the range of 1.45 to 6.0.

The driver 18 includes an axially outer passage 50 which receives the mounting head 16 in communication with a transverse passage 52 that extends laterally to a discharge port 54 for receiving and passing the core C in the direction of the arrow 56. As illustrated in the drawings, the transverse passage 52 is vertically upwardly inclined so that, when the apparatus is rotated at slow speeds, the core C will not become "hung up" on the top wall 53 of the transverse passage 52. As illustrated in the drawing, the mounting head 16 includes an enlarged diameter internal passage 51 for axially freely passing the core C to the passages 50 and 52.

The entire inner and outer cylindrical surfaces 22 and 24 can be plated with chrome material or the like to further reduce resistance to relative movement of the drill shank 12 through the workpiece 14 and decrease the frictional heat loss.

The rotary driver 18 includes an axially inner stub shaft 60 which is coupled to a machine collet or chucking device, schematically designated 62, for rotation about the axis 33 as well as for axial movement toward the workpiece 14 in the direction of arrows 64 and away from the workpiece in the direction of arrow 66. The chucking device 62 may suitably rotate about the axis 33 such that the circumferential speed of the cutting edge 36 is in the range of 10 to 50 surface feet per minute.

THE OPERATION

The hollow drill shank 12 is mounted in the rotary drive head 18 and secured thereto via screw 20. The drive head 18 is mounted in a collet or chucking device 62 in the usual fashion for rotational movement about the axis 13 as well as for axial movement toward and away from the workpiece 13.

The rotary chucking device 62 is axially moved in the direction of the arrow 64 to advance the cutting edge 36 into engagement with the surface S of the workpiece 13 at a rate in the range of 0.002 to 0.015 inches per revolution. The sharp cutting edge 36 shears the material, much like a knife, as the tool advances into the workpiece 33. Concurrently, a cylindrical core C is formed by the shearing action as the tool advances, and the core C is compressed radially by the beveled surface 34, forcing the material into the throat area 42, thus resulting in a core C which is 1½ to 2 times longer than the core was prior to being compressed. The core C, which has been subjected to plastic strain, reaches maximum compression at P as it passes through the throat 42. After the core C passes through the throat 42, it slightly radially expands as it passes upwardly through the enlarged diameter tubular portion 39 which has a slightly larger diameter DE than the relaxed core diameter, so that no additional tool thrust is required to feed the tool into the workpiece, and permits the core C to proceed freely axially inwardly. As the core C passes through the enlarged throat 51 into the inclined transverse discharge passage 52, centrifugal force generated by the rotating driver and tool causes the core C to bend in a favored direction, whereupon the core C is forced to exit the driver through discharge port 54.

The drill will produce a clean, high-quality hole with no "fuzz" about the edges thereof. The tool is self-centering and will not hunt, and provides for easy scrap clean-up and produces a solid core of waste material, as opposed to small fractional pieces and dust which can be hazardous to the user's health.

ALTERNATE EMBODIMENT

Referring now more particularly to FIGS. 5 and 6, a slightly modified construction 10a is illustrated, and generally similar parts will be identified by general similar reference characters followed by the letter a. The primary difference between the apparatus 10a and the apparatus 10 is that the mounting head 16a and lower part of driver 18a include complimental threads 70, 71 rather than the set screw 20, and the outside diameter 72 of the head 16a and the drive head 18a is greatly reduced to achieve as small an outside diameter as is practical to accommodate aerospace industry tooling. The drill shank mounting head 16a also differs in that it includes an annular external shoulder 76 having an axially inner, tapering surface 78 which axially outwardly diverges at approximately 60° to the rotational axis 33a, and the driver 18a includes an axially outer terminal end 79 provided with a complimentally inclined mating surface 80 for mating with the surface 78 which seats thereagainst.

The driver 18a further differs in that the transverse passage 52a comprises an arcuate cut-out 82, in one side wall portion 83 thereof, which extends substantially to the diametrically opposite side wall portion 84 and includes an upper inclined surface 86 for laterally outwardly directing the core C to a discharge port 54a in side 83.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. Drill apparatus for cutting a circular hole in a workpiece to form a core and removing the core from the hole thus formed, comprising:

a rotatable hollow elongate drill shank having an annular cutting edge, of a predetermined diamter, at the axially outer end thereof for cutting a circular hole in said workpiece;

drive means, detachably coupled to the axially inner end of said drill shank, for rotating said drill shank about its longitudinal axis and for relatively moving said drill shank and said workpiece toward and away from each other;

said drill shank including a hollow cylindrical tubular member including an inlet opening at the axially outer end thereof;

an axially inner discharge opening, and an elongate axially extending passage for communicating drilled material from said inlet opening to said discharge opening;

a hollow cylindrical, axially outer, material-compressing terminal portion for receiving and radially compressing material cut by said cutting edge to form a compressed core of plastically strained material, which has an outside diameter substantially less than said predetermined diameter of said annular cutting edge;

said terminal portion being provided with opposed, axially extending inner and outer cylindrical surface portions which radially converge in an axially outward direction to form said annular, terminal material-cutting edge, of said predetermined diameter;

a hollow cylindrical throttle portion, axially inwardly adjacent said compressing portion, of a predetermined radial thickness and predetermined axial length, defining a material-receiving throat having a predetermined lesser diameter, for receiving and axially passing the radially compressed core from said compressing portion;

a hollow cylindrical discharge portion, axially inwardly adjacent said throttle portion, defining an axially extending material-receiving discharge passage of a diameter which is greater than the diameter of said throat but less than the diameter of said cutting edge to allow the compressed material to partially radially expand and freely axially pass axially inwardly of said throat;

said drive means including an axially extending internal passage in communication with the axially inner end of said passage in said tubular member for receiving and axially passing said core material, and a transversely extending discharge passage for receiving said core from the axial passage in said drive means and passing it radially outwardly;

said predetermined axial length being substantially less than said predetermined lesser diameter;

said tubular member including an outer, right circular, cylindrical surface concentric about said longitudinal axis; said inner cylindrical surface of said compressing portion diverging radially outwardly in an axially outward direction;

said hollow cylindrical discharge portion including a cylindrical sidewall portion having a radial thickness less than the radial thickness of said throttle portion;

said cylindrical surface portion of said hollow cylindrical discharge portion diverging radially outwardly in an axially inward direction at a rate of at least 0.001 inches per axial inch; the ratio of said predetermined diameter of said annular cutting edge, less the diameter of said throat relative to said predetermined diameter of said annular cutting edge, lies within the range of 0.25 to 0.36, and the ratio of said predetermined diameter, less the diameter of said throat, relative to said predetermined diameter less the diameter of said discharge passage lies within a range of 1.45 to 6.0; and the included angle between said inner and outer cylindrical surface portions which converge to form said cutting edge lies within a range of 30° to 45°;

said axially inner end of said drill shank and said drive means including complimentally threaded portions in threaded engagement, said drive means and said drill shank including complimentally tapered mating seating surfaces in bearing seating engagement.

said tubular member including an additional inner surface portion which diverges radially outwardly in an axially inner direction from the axially inner end of said right circular cylindrical portion.

2. Hole production apparatus for cutting a circular hole in a workpiece and removing the severed material from the formed hole, comprising:

a rotatable, elongate, hollow drill shank having an annular cutting knife edge of a predetermined diameter at the axially outer end thereof for cutting a circular hole in said workpiece;

drive means, detachably coupled to an axially inner end of said drill shank, for rotating said drill shank about its longitudinal axis and for relatively moving said drill shank and said object toward and away from each other;

said drill shank including a hollow cylindrical tubular member having an inlet opening at the axially outer end thereof, an outlet opening at the axially inner end thereof, and an elongate, axially-extending passage for communicating material which has been severed by said drill shank from said inlet opening to said outlet opening;

said tubular member including means for radially inwardly compressing and concurrently axially elongating the material severed from said object by said drill shank as said drill shank and said object are relatively moved toward each other, to form an elongate core of plastically strained removed material comprising an inner tapered cylindrical wall surface portion which radially inwardly converges in an axially inward direction from said annular cutting edge, and a right circular cylindrical wall surface portion extending axially inwardly from the axially inner end of said tapered wall surface to provide a reduced diameter throat for receiving and axially passing said core of removed material;

said tubular member including means, axially inward of said throat, for receiving and axially freely passing said core of material, including an elongate tubular portion having an internal diameter which is greater than the diameter of said throat but less than the diameter of said annular cutting edge, to allow the said compressed core material to partially expand and freely pass axially inwardly of said throat; said internal diameter of said elongate tubular portion gradually increasing in a radially inward direction;

said tubular member being of such construction that the included angle between said inner tapered wall surface and the outer surface of said tubular member lies within the range of 30° to 45°; the ratio of said predetermined diameter, less the diameter of said throat, relative to said predetermined diameter lies within a range of 0.25 to 0.36; the ratio of said internal diameter of said elongate tubular portion, less the diameter of said throat, relative to the diameter of said throat, lies within a range of 0.16 to 0.39; the ratio of said predetermined diameter, less the internal diameter of said elongate tubular portion, relative to said predetermined diameter lies within a range of 0.09 to 0.04; the ratio of said predetermined diameter, less the diameter of said throat, relative to said predetermined diameter less said internal diameter of said elongate tubular portion less within a range of 1.45 to 6.00; and the axial length of right circular cylindrical wall surface portion being substantially less than the diameter of said throat;

said drive means including an axially extending internal passage in communication with the axially inner end of said passage in said tubular member for receiving and axially passing said core material, and a transversely extending discharge passage for receiving said core from the axial passage in said drive means and passing it radially outwardly.

* * * * *